US012801322B2

(12) United States Patent
Yamamoto

(10) Patent No.: US 12,801,322 B2
(45) Date of Patent: Nov. 17, 2026

(54) COMMUNICATION TERMINAL, CONTROL METHOD, AND STORAGE MEDIUM

(71) Applicant: CANON KABUSHIKI KAISHA, Tokyo (JP)

(72) Inventor: Koichi Yamamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/988,514

(22) Filed: Dec. 19, 2024

(65) Prior Publication Data

US 2025/0208809 A1 Jun. 26, 2025

(30) Foreign Application Priority Data

Dec. 26, 2023 (JP) ................................ 2023-219907
Aug. 6, 2024 (JP) ................................ 2024-130202

(51) Int. Cl.
*G06F 3/14* (2006.01)
*G06F 3/04845* (2022.01)

(52) U.S. Cl.
CPC ............ *G06F 3/14* (2013.01); *G06F 3/04845* (2013.01)

(58) Field of Classification Search
CPC .... G06F 3/14; G06F 3/04845; G06F 11/1438; G06F 11/1415; G06F 11/1458; G06F 16/54; G06F 9/451; G06F 9/452; G06F 16/955; G06F 16/958
See application file for complete search history.

(56) References Cited

U.S. PATENT DOCUMENTS 7,603,533 B1 * 10/2009 Tsypliaev .............. G06F 21/575 711/158
7,953,948 B1 * 5/2011 Dyatlov .............. G06F 11/1435 711/158
9,032,199 B1 5/2015 Dibble
10,037,591 B2 * 7/2018 Ichikawa ................ G06F 30/34
2010/0180164 A1 * 7/2010 Miyamoto .............. G06F 11/32 714/57
2011/0129200 A1 * 6/2011 Higeta ................... H04N 5/911 386/263
2015/0276938 A1 * 10/2015 Yamada ................. G16H 30/20 250/206
2017/0227505 A1 * 8/2017 Araki ..................... F04D 27/001
2022/0068154 A1 * 3/2022 Breed ..................... G06V 10/82
2025/0094412 A1 * 3/2025 Mishra ................ G06F 16/2246

FOREIGN PATENT DOCUMENTS

CN 110572527 A * 12/2019 ......... H04N 1/00938
CN 108156013 B 8/2021
CN 114429614 A * 5/2022 ............. G06Q 50/04
JP 2010-219792 A 9/2010
JP 2014-182793 A 9/2014
JP 2015173863 A * 10/2015
TW 201248513 A * 12/2012

* cited by examiner

*Primary Examiner* — Ricardo Osorio
(74) *Attorney, Agent, or Firm* — Canon U.S.A., Inc. IP Division

(57) ABSTRACT

A communication terminal includes a reception unit for receiving image information acquired by rendering a web page, a display unit for displaying an image based on the image information, and a control unit for differentiating the image to be displayed between a case where the display unit displays the image after display of the image is abnormally terminated and a case where the display unit displays the image in normal startup.

11 Claims, 13 Drawing Sheets

COMMUNICATION TERMINAL, CONTROL METHOD, AND STORAGE MEDIUM

BACKGROUND OF THE INVENTION

Field of the Invention

The present invention relates to a communication terminal, a control method, and a storage medium.

Description of the Related Art

Communication apparatuses have become widespread that are equipped with a web browser (hereinbelow, referred to as a browser) and allows a user to browse web pages on the browser. Such communication apparatuses display a web page of the external service via the browser to be able to link with an external service.

One form of browser is referred to as a cloud browser, in which a browser engine for generating a rendering result of a web page is arranged on a cloud server. The cloud browser is a method for browsing a web page by transmitting a rendering result rendered by the browser engine on the cloud server to a communication apparatus and displaying the rendering result thereon.

The browser engine performs high loaded processing, such as web page analysis processing or execution processing, and thus it is possible to reduce the load on the communication apparatus (Japanese Patent Application Laid-Open No. 2014-182793) by using the cloud browser.

Various device resources required for a personal computer (PC) are virtually allocated to a virtual machine in the cloud. Thus, the browser engine running on the virtual machine can operate in the same way as it is running on a PC.

However, if an application that displays a rendering result on the communication apparatus abnormally terminates due to insufficient memory or the like in the cloud browser, there is an issue that the previously displayed rendering result cannot be resumed at the time of resuming the application in the communication apparatus.

On the other hand, in a form in which a communication apparatus equipped with a browser engine communicates with a server to perform web access, a method is discussed for resuming an operation in a case where abnormal termination occurs on the server side (Japanese Patent Application Laid-Open No. 2010-219792).

According to Japanese Patent Application Laid-Open No. 2010-219792, it is discussed that user interface (UI) information is presented to the communication apparatus to enable it to resume processing when abnormal termination occurs on the server side, but a method for resuming the operation if abnormal termination occurs on the communication apparatus is not discussed. Further, a form in which the communication apparatus does not include a browser engine, such as a cloud browser, is also not discussed.

SUMMARY OF THE INVENTION

The present invention is realized by the following configurations in order to achieve the above-described issue.

According to an aspect of the present invention, a communication terminal includes a reception unit configured to receive image information acquired by rendering a web page, a display unit configured to display an image based on the image information, and a control unit configured to differentiate the image to be displayed between a case where the display unit displays the image after display of the image is abnormally terminated and a case where the display unit displays the image in normal startup.

Further features of the present invention will become apparent from the following description of embodiments with reference to the attached drawings.

DESCRIPTION OF THE EMBODIMENTS

Figure 1:
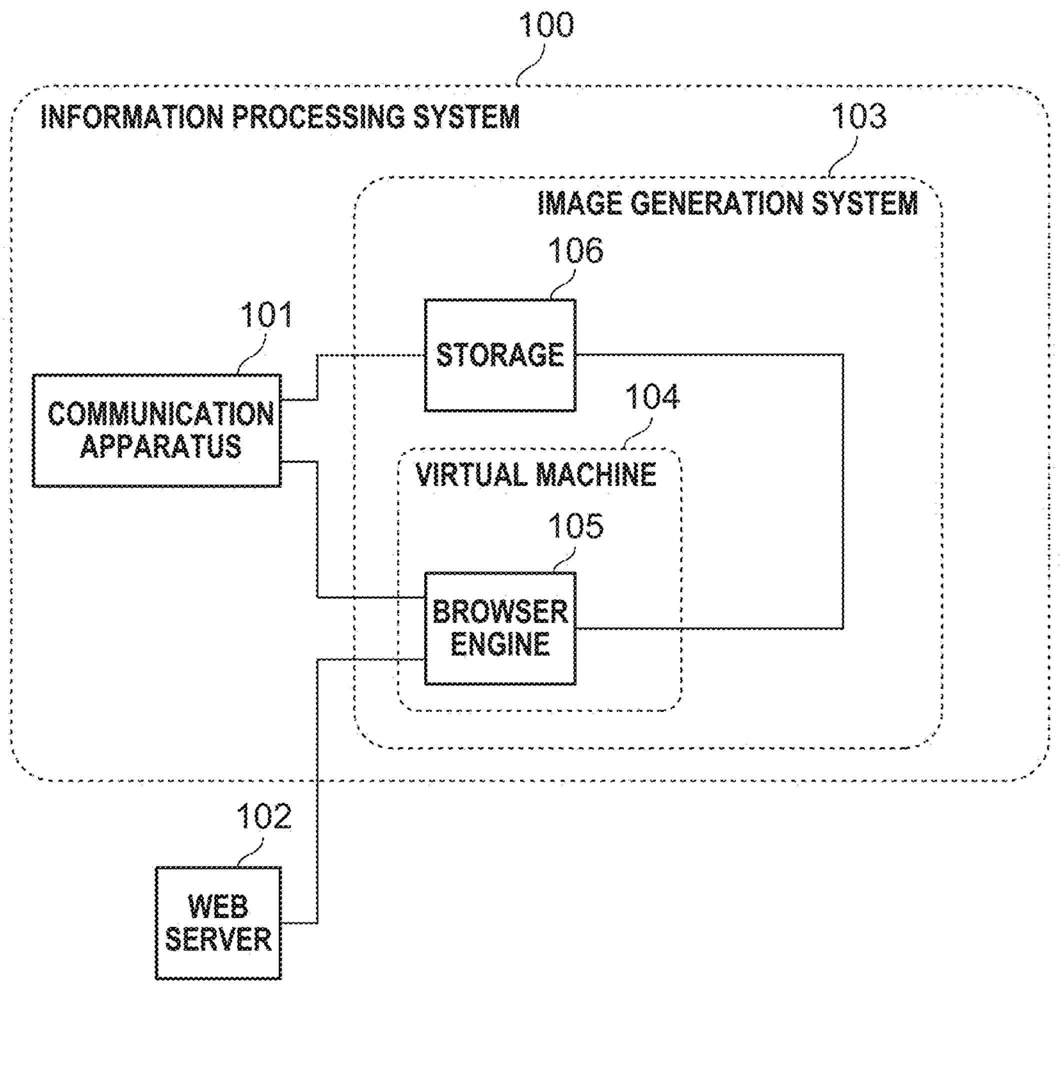
FIG. 1 illustrates a configuration of an information processing system according to a first embodiment of the present invention.

Embodiments for implementing the present invention (hereinbelow, referred to as "embodiments") will be described in detail below with reference to the attached drawings. However, the following embodiments do not limit the present invention according to the scope of claims. Further, not all combinations of features described in the embodiments are necessarily essential to the solutions of the present invention. The same components are denoted by the same reference numerals throughout the descriptions of the embodiments. Each of the embodiments of the present invention described below can be implemented solely or as a combination of a plurality of the embodiments or features thereof where necessary or where the combination of elements or features from individual embodiments in a single embodiment is beneficial.

FIG. 1 illustrates a configuration of an information processing system 100 according to a first embodiment of the present invention. The information processing system 100 includes a communication apparatus 101 and an image generation system 103.

The communication apparatus 101 is an apparatus on which a user can view a screen and perform an operation. The communication apparatus 101 is an example of a communication terminal according to the present invention. For example, the communication apparatus 101 is a thin client personal computer (PC) or the like that does not have a printer or a sophisticated browsing function.

The image generation system 103 includes a virtual machine 104 equipped with a browser engine 105 and a storage 106.

The browser engine 105 runs on the virtual machine 104, analyzes and renders a web content, and performs imaging of a rendering result.

The virtual machine 104 stores the image generated by imaging by the browser engine 105 in the storage 106.

The virtual machine 104 is connected to the communication apparatus 101, a web server 102, the storage 106, and the like via a network. The web server 102 stores the web content.

Examples of web contents include Hyper Text Markup Language (HTML), Cascading Style Sheets (CSS), JavaScript®, an image file in a format such as Joint Photographic Experts Group (JPEG), Portable Network Graphic (PNG), or the like, and a moving image file in a format such as Moving Picture Experts Group (MPEG)-4 Part 14 (MP4), WebM, or the like.

The communication apparatus 101 is also connected to the virtual machine 104, the storage 106, and the like via the network. The network may be, for example, the Internet, a wide area network (WAN), a local area network (LAN), or a combination of these. A plurality of communication apparatuses 101 may also exist.

A flow up to generating a screen of the communication apparatus 101 will now be briefly described, and then a configuration and a processing flow will be described in more detail. The communication apparatus 101 transmits uniform resource locator (URL) information of a web page to the virtual machine 104 to request the virtual machine 104 to read the URL of the specified web page.

When the virtual machine 104 receives the URL information of the web page transmitted from the communication apparatus 101, the virtual machine 104 requests the browser engine 105 to read the web page with the corresponding URL from the web server 102.

In response to the request, the browser engine 105 reads the web page with the corresponding URL from the web server 102. In other words, the browser engine 105 acquires the web content from the web server 102.

Subsequently, the browser engine 105 generates a rendering result acquired by rendering the web content and performs imaging the rendering result. The image after the imaging is then transmitted by the virtual machine 104 to the storage 106 and stored therein. The communication apparatus 101 acquires the stored image from the storage 106 and displays the acquired image, so that a screen of the communication apparatus 101 is generated.

Next, hardware and software configurations of the communication apparatus 101, a hardware configuration of the virtual machine 104, and software configurations of the virtual machine 104 and the browser engine 105 will specifically be described.

Hardware Configuration of Communication Apparatus

Figure 2:
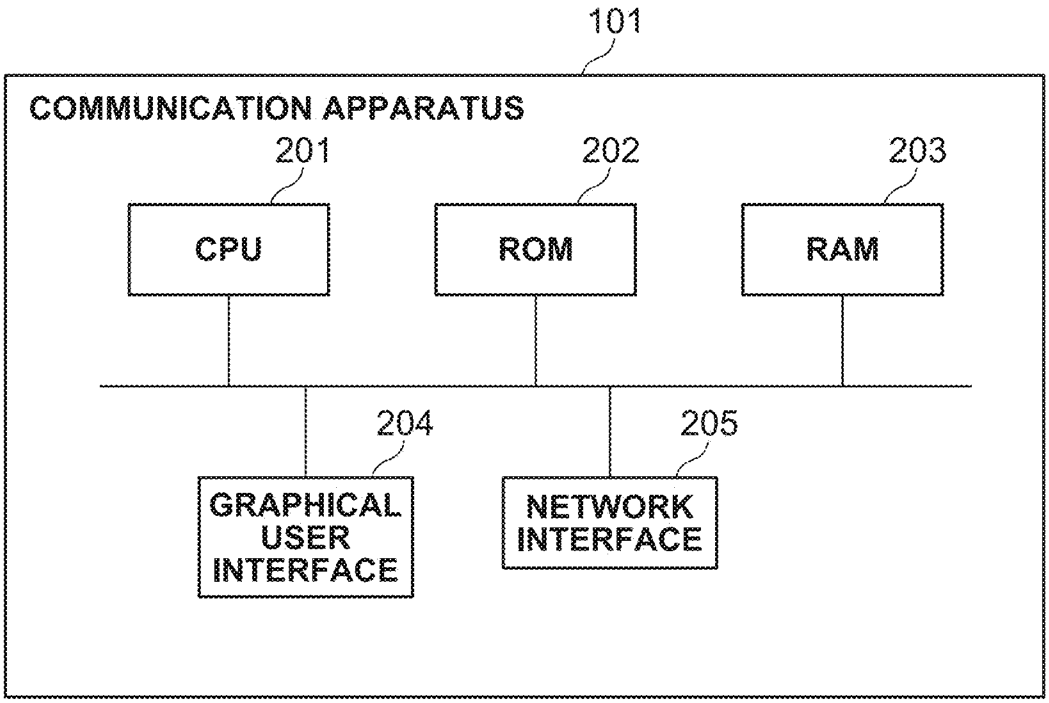
FIG. 2 illustrates a hardware configuration of a computer apparatus that configures a communication apparatus according to the first embodiment of the present invention.

FIG. 2 illustrates a hardware configuration of a computer apparatus that configures the communication apparatus 101 according to the first embodiment of the present invention.

The communication apparatus 101 includes a central processing unit (CPU) 201, a read-only memory (ROM) 202, a random access memory (RAM) 203, a graphical user interface 204, and a network interface 205 as the hardware configuration.

(CPU 201)

The CPU 201 controls the communication apparatus 101.

(ROM 202)

The ROM 202 stores a program and a parameter that do not require modification.

(RAM 203)

The RAM 203 temporarily stores a program and data supplied from an external apparatus or the like.

(Graphical User Interface 204)

The graphical user interface 204 is a display operation unit that can be used by a screen for displaying stored data and supplied data, a pointing device such as a mouse and a touch panel for inputting data in response to a user operation, and an input device such as a keyboard.

The graphical user interface 204 is an example of a display unit according to the present invention.

(Network Interface 205)

The network interface 205 is used to connect to the network.

The communication apparatus 101 may also include a hard disk or a memory card, which are fixedly installed therein. The communication apparatus 101 may also include a detachable external storage device including an optical disk, such as a flexible disk (FD) and a compact disk (CD), a magnetic card, an optical card, an integrated circuit (IC) card, and a memory card.

Software Configuration of Communication Apparatus

Figure 3:
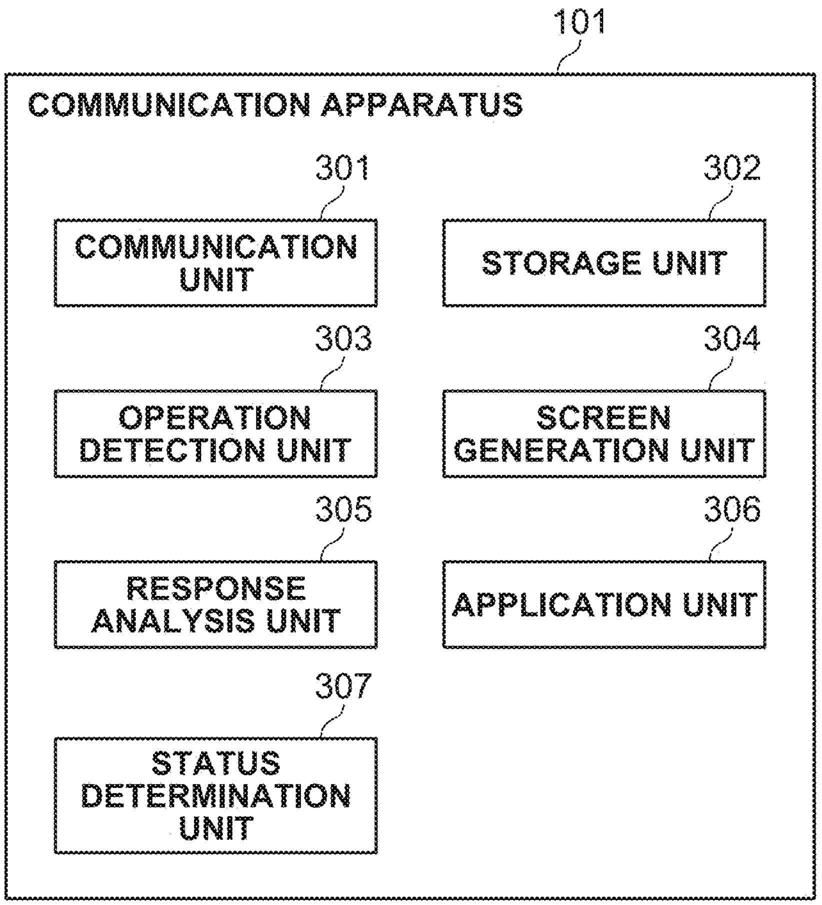
FIG. 3 illustrates a software configuration of the computer apparatus that configures the communication apparatus according to the first embodiment of the present invention.

FIG. 3 illustrates a software configuration of the computer apparatus that configures the communication apparatus 101 according to the first embodiment of the present invention.

The communication apparatus 101 includes a communication unit 301, a storage unit 302, an operation detection unit 303, a screen generation unit 304, a response analysis unit 305, an application unit 306, and a status determination unit 307 as the software configuration.

(Communication Unit 301)

The communication unit 301 is an example of a communication unit according to the present invention that controls communication performed by the communication apparatus 101 via the network interface 205. The communication unit 301 functions as a transmission unit and a reception unit according to the present invention. The communication unit 301 switches an operation information transmission flag in the storage unit 302, which will be described below.

(Storage Unit 302)

The storage unit 302 stores information such as image information, an abnormal termination flag, and the operation information transmission flag, which will be described below. The storage unit 302 is an example of a storage unit according to the present invention.

(Operation Detection Unit 303)

The operation detection unit 303 detects an operation content when the graphical user interface 204 is operated. The operation detection unit 303 also determines whether an operated screen is an operation on an apparatus specific screen (described below) that is specific to the communication apparatus 101. The operation detection unit 303 is an example of an operation detection unit according to the present invention.

(Screen Generation Unit 304)

The screen generation unit 304 generates a screen on the graphical user interface 204. Specifically, for example, the screen generation unit 304 displays an image based on the image information, which will be described below, on the graphical user interface 204, and thus the screen on the graphical user interface 204 is generated. The screen generation unit 304 is an example of a screen generation unit according to the present invention.

(Response Analysis unit 305)

The response analysis unit 305 analyzes a content of information that the communication unit 301 receives from the virtual machine 104. The response analysis unit 305 is an example of a response analysis unit according to the present invention.

(Application Unit 306)

The application unit 306 controls an application, such as starting and ending the application to perform processing as a cloud browser. The application unit 306 also switches the abnormal termination flag, which will be described below, in the storage unit 302. The application unit 306 is an example of an application control unit according to the present invention.

(Status Determination Unit 307)

The status determination unit 307 determines the abnormal termination flag and the operation information transmission flag, both of which will be described below, in the storage unit 302. The status determination unit 307 is an example of a status determination unit according to the present invention.

Hardware Configuration of Virtual Machine

Figure 4:
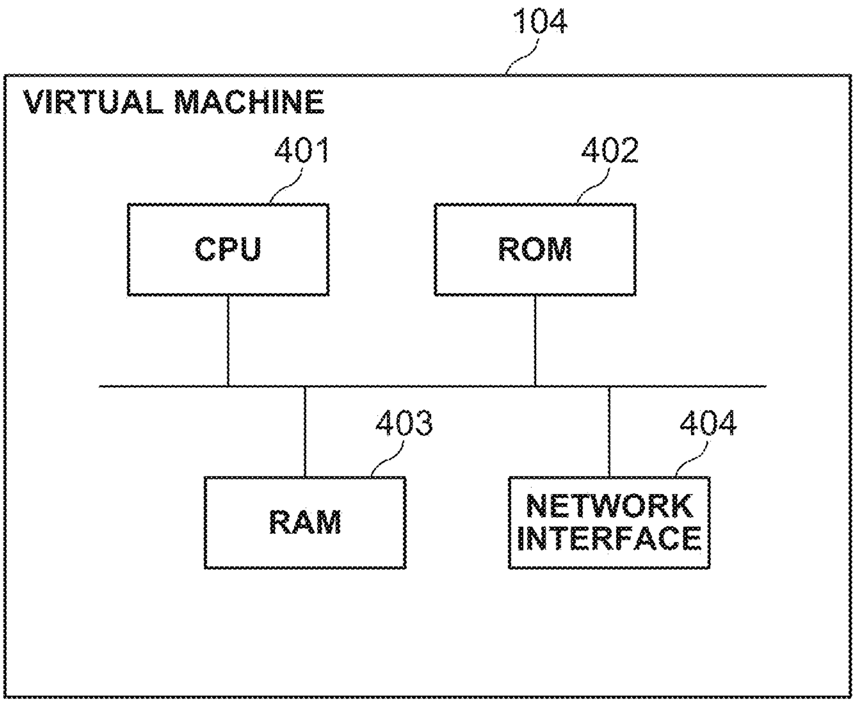
FIG. 4 illustrates a hardware configuration of a computer apparatus that configures a virtual machine according to the first embodiment of the present invention.

FIG. 4 illustrates a hardware configuration of a computer apparatus that configures the virtual machine 104 according to the first embodiment of the present invention. The virtual machine 104 includes a CPU 401, a ROM 402, a RAM 403, and a network interface 404 as the hardware configuration.

(CPU 401)

The CPU 401 controls the virtual machine 104, the browser engine 105, and the like.

(ROM 402)

The ROM 402 stores a program and a parameter that do not require modification.

(RAM 403)

The RAM 403 temporarily stores a program and data supplied from an external apparatus or the like.

(Network Interface 404)

The network interface 404 is used to connect to the network.

Figure 5:
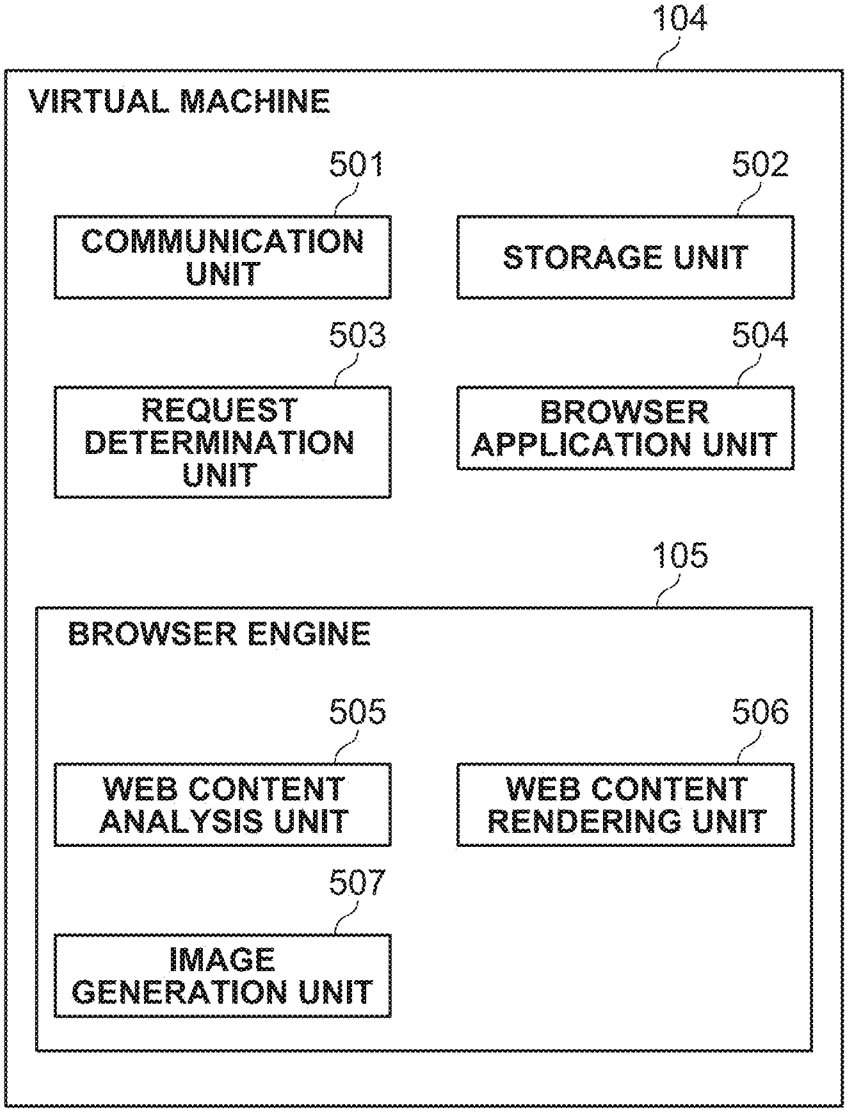
FIG. 5 illustrates a software configuration of the virtual machine and a browser engine according to the first embodiment of the present invention.

FIG. 5 illustrates a software configuration of the virtual machine 104 and the browser engine 105 according to the first embodiment of the present invention.

Software Configuration of Virtual Machine

The virtual machine 104 includes a communication unit 501, a storage unit 502, a request determination unit 503, a browser application unit 504, and the browser engine 105 as the software configuration.

(Communication Unit 501)

The communication unit 501 controls communication performed by the virtual machine 104 via the network interface 404. The communication unit 501 also performs communication between the virtual machine 104 and the browser engine 105. The communication unit 501 is an example of a communication unit according to the present invention.

(Storage Unit 502)

The storage unit 502 stores operation information transmitted from the communication apparatus 101. An example of the operation information transmitted from the communication apparatus 101 is URL information of a web page.

Based on the URL information of the web page, the browser engine 105 acquires and renders the web content, and performs imaging of the rendering result. The storage unit 502 also stores these results, which will be described in detail below.

In other words, the storage unit 502 also stores the web content, the rendering result acquired by rendering the web content, and the image obtained by imaging the rendering result. The storage unit 502 is an example of a storage unit according to the present invention.

(Request Determination Unit 503)

The request determination unit 503 determines a content that the communication unit 501 receives from the communication apparatus 101 or the browser engine 105. The request determination unit 503 is an example of a request determination unit according to the present invention.

(Browser Application Unit 504)

The browser application unit 504 controls a browser application, such as starting and ending the browser application to perform processing as the cloud browser. The browser application unit 504 is an example of a browser application control unit according to the present invention.

Software Configuration of Browser Engine

The browser engine 105 includes a web content analysis unit 505, a web content rendering unit 506, and an image generation unit 507.

(Web Content Analysis Unit 505)

The web content analysis unit 505 performs analysis of the web content, execution of operation information reflection processing in response to an operation information reflection processing request from the virtual machine 104, and the like. The web content analysis unit 505 is an example of a web content analysis unit according to the present invention. For example, it is assumed that the operation information reflection processing request is a request to read the web page with the corresponding URL from the web server 102. The web content analysis unit 505 reads the web page with the corresponding URL from the web server 102 and acquires the web content as the operation information reflection processing corresponding to the operation information reflection processing request. Subsequently, when the operation information reflection processing is completed, the web content analysis unit 505 transmits an operation information result to notify the virtual machine 104 of completion of the processing. The web content analysis unit 505 may determine whether the operation information reflection processing request is received from the virtual machine 104, determine a timing for web content time lapse rendering reflection processing, and perform a web operation on the analyzed web content.

(Web Content Rendering Unit 506)

The web content rendering unit 506 renders the analyzed web content. For example, the web content rendering unit 506 renders the web content read by the web content analysis unit 505 and generates a rendering result. In a case where the web content analysis unit 505 determines the timing for the web content time lapse rendering reflection processing, the web content rendering unit 506 may perform rendering reflection processing with a lapse of time based on the determination. After completing the rendering processing, the web content rendering unit 506 may transmit a rendering completion notification to notify the virtual machine 104 of the completion of rendering processing.

(Image Generation Unit 507)

The image generation unit 507 performs imaging of the rendering result rendered by the web content rendering unit 506. The image generation unit 507 is an example of an image generation unit according to the present invention.

Processing flows of the communication apparatus 101, the virtual machine 104, and the browser engine 105 according to the first embodiment of the present invention will be described in order below with reference to FIGS. 6 to 10.

Figure 6:
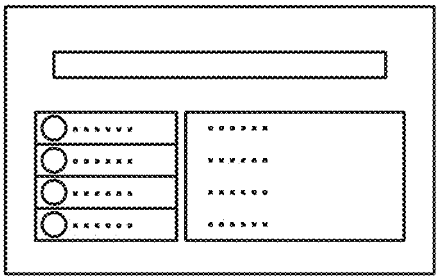
FIG. 6 illustrates an example of an image generated by performing imaging a rendering result of a web content by an image generation unit according to the first embodiment of the present invention.

FIG. 6 illustrates an example of an image generated by the image generation unit 507 according to the first embodiment of the present invention by performing imaging of the rendering result of the web content.

Figure 7A:
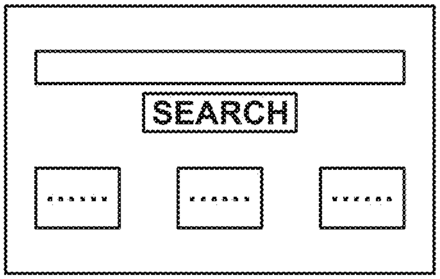
FIGS. 7A and 7B illustrate examples of graphical user interface screens generated by a screen generation unit according to the first embodiment of the present invention by displaying an image on a graphical user interface.
Figure 7B:
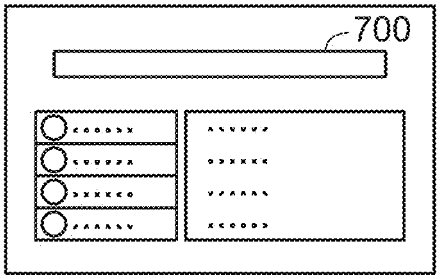

FIGS. 7A and 7B illustrate examples of screens on the graphical user interface 204 generated by displaying the image on the graphical user interface 204 by the screen generation unit 304 according to the first embodiment of the present invention.

FIG. 7A illustrates the screen on the graphical user interface 204 when the screen generation unit 304 displays a home image for a home screen on the graphical user interface 204, and the home screen is displayed in this case.

FIG. 7B illustrates the screen on the graphical user interface 204 when the screen generation unit 304 displays the image stored in the storage unit 302, which is the image illustrated in FIG. 6, on the graphical user interface 204. The screen illustrated in FIG. 7B includes a text input field 700.

A relationship between the screens in FIGS. 7A and 7B is that FIG. 7A illustrates a search screen that appears first at a time of normal startup and FIG. 7B illustrates a different screen, other than the search screen, that is displayed, for example, as a result of a user operation.

Processing of Communication Apparatus

Figure 8:
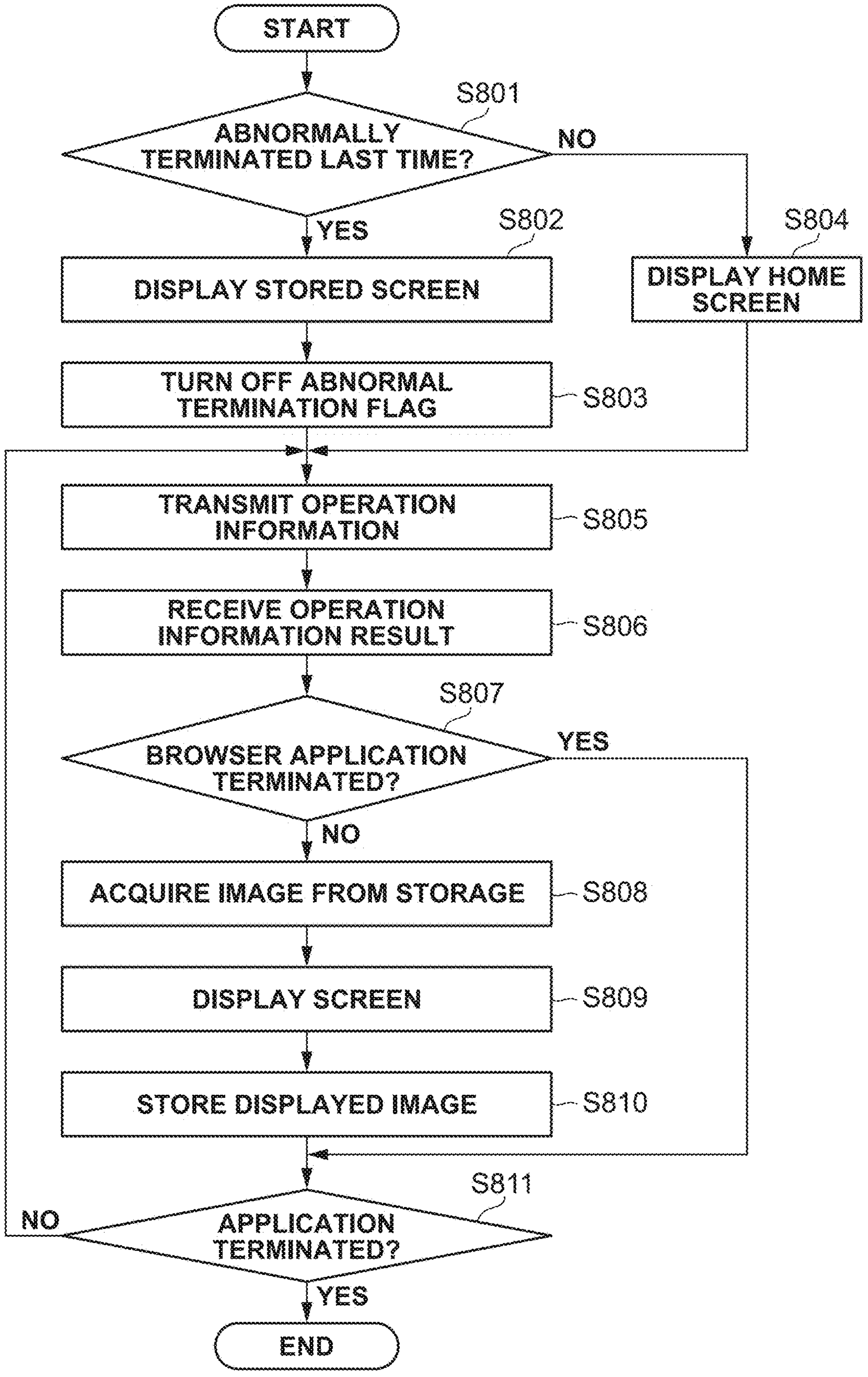
FIG. 8 is a flowchart illustrating a processing flow of the communication apparatus according to the first embodiment of the present invention.

FIG. 8 is a flowchart illustrating the processing flow of the communication apparatus 101 according to the first embodiment of the present invention. At a start of the processing in the present flowchart, it is assumed that the communication apparatus 101 has already started an application in the application unit 306. It is also assumed that the communication apparatus 101, the virtual machine 104, the storage 106, and the like are connected via the network, and the operation detection unit 303 receives the operation information.

As will be described below, in a case where the application is abnormally terminated in previous processing, the abnormal termination flag in the storage unit 302 is ON.

(Step S801)

In step S801, the status determination unit 307 determines whether the application has been abnormally terminated in a previous time based on the abnormal termination flag in the storage unit 302. As a result of the determination, if the abnormal termination flag is ON (YES in step S801), the processing proceeds to step S802. If the abnormal termination flag is OFF (NO in step S801), the processing proceeds to step S804. Here, it is assumed that it is started normally, the abnormal termination flag is OFF, and the processing proceeds to step S804.

(Step S804)

In step S804, since the application has been normally terminated in the previous time, the screen generation unit 304 displays the image for the home screen illustrated in FIG. 7A on the graphical user interface 204 as usual. Thus, the home screen illustrated in FIG. 7A is generated.

(Step S805)

In step S805, the communication unit 301 functions as the transmission unit and transmits the operation information to the virtual machine 104. The operation information includes, for example, a termination request to terminate a browser application, and transmission of the URL information of the web page. Here, it is assumed that the URL information of the web page is transmitted as the operation information. The URL information of the web page as the operation information that is transmitted by the communication unit 301 as the transmission unit is also referred to as the operation information of the web page.

(Step S806)

In step S806, the communication unit 301 functions as the reception unit and receives the operation information result from the virtual machine 104. The response analysis unit 305 functions as the response analysis unit and analyzes a content of the operation information result. The operation information result is information about a result corresponding to the operation information transmitted in step S805.

As described above, the URL information of the web page is transmitted as the operation information, so that web page read information is received from the virtual machine 104 as the operation information result corresponding thereto. The web page read information, which will be described below, is information regarding an image (hereinbelow, also referred to as image information) for notifying that the image acquired by rendering the web page is stored in the storage 106. On the other hand, in a case where the operation information transmitted in step S805 is transmission of the termination request to terminate the browser application, the operation information result corresponding thereto is information about the termination of the browser application from the virtual machine 104.

(Step S807)

In step S807, the application unit 306 determines whether the received operation information result is the termination of the browser application. Here, the web page read information is received from the virtual machine 104, so that the determination in step S807 is NO, and the processing proceeds to step S808. In a case where the received operation information result is the information about the termination of the browser application (YES in step S807), the application unit 306 functions as the application control unit and performs termination processing on the application running on the communication apparatus 101. The processing then proceeds to step S811. In step S811, the application unit 306 determines whether the application is terminated. In a case where the determination in step S807 is YES and the processing proceeds to step S811, the determination in step S811 is also YES, and the present processing is terminated.

(Step S808)

In step S808, the communication unit 301 acquires an image from the storage 106 based on the web page read information. As described above, the web page read information is the image information, and thus the communication unit 301 functions as the reception unit that acquires the image based on the image information from the storage 106.

(Step S809)

In step S809, the screen generation unit 304 functions as the screen generation unit and generates a screen based on the image based on the image information received by the communication unit 301 as the reception unit in step S808. For example, it is assumed that the image illustrated in FIG. 6 is received from the storage 106 in step S808. In this case, the screen generation unit 304 displays the image illustrated in FIG. 6, which is based on the image information, on the graphical user interface 204, and the screen on the graphical user interface 204 illustrated in FIG. 7B is generated.

(Step S810)

In step S810, the storage unit 302 stores the image displayed on the graphical user interface 204 in step S808, that is, the image illustrated in FIG. 6. In other words, the storage unit 302 functions as a storage unit that stores the image to be displayed on the graphical user interface 204 based on the image information received by the communication unit 301 as the reception unit from the storage 106 in step S808.

(Step S811)

In step S811, the application unit 306 determines whether the application is terminated as described above. Here, since the application is not yet terminated, the application unit 306 determines as NO in step S811, and the processing proceeds to step S805.

There may be a case where the application goes down or abnormally terminates due to insufficient memory or the like until the determination in step S811 becomes YES. For example, to make it easy to understand, it is assumed that the application is abnormally terminated after the image illustrated in FIG. 6 is stored in the above-described the storage unit 302 and before the next operation information is input, that is, before next transmission is performed in step S805. In this case, the application unit 306 itself is started up, so that the application unit 306 detects the abnormal termination of the application. Upon detecting the abnormal termination, the application unit 306 subsequently sets the abnormal termination flag in the storage unit 302 to ON. On the other hand, the application itself is in a terminated state due to the abnormal termination and thus needs to be restarted again. At the time of restart, the determination in step S801 is performed again. At the start of the current processing, the abnormal termination flag in the storage unit 302 is ON because of the previous abnormal termination. In step S801, the status determination unit 307 thus determines that the abnormal termination flag is ON (YES in step S801), and the processing proceeds to step S802.

(Step S802)

In step S802, the screen generation unit 304 generates a screen by displaying the image based on the image information stored in the storage unit 302 on the graphical user interface 204. As described above, the image illustrated in FIG. 6 corresponding to the screen illustrated in FIG. 7B is stored in the storage unit 302 before the abnormal termination. Thus, the screen generated by the screen generation unit 304 by displaying the image illustrated in FIG. 6 stored in the storage unit 302 on the graphical user interface 204 is the screen illustrated in FIG. 7B. In this way, it is selected whether to display the image of the home screen illustrated in FIG. 7A or the image of the screen illustrated in FIG. 7B, as a result of the determination on the abnormal termination flag by the status determination unit 307. Then, the screen generation unit 304 functions as a control unit that changes the image displayed on the graphical user interface 204 according to the selection by the status determination unit 307. Accordingly, the home screen illustrated in FIG. 7A at the normal startup or the screen illustrated in FIG. 7B at the restart after the abnormal termination is displayed.

(Step S803)

In step S803, the application unit 306 turns OFF the abnormal termination flag in the storage unit 302. Then, the processing proceeds to step S805 again, and the processing in step S805 and subsequent steps are repeated until it is determined as YES in step S811.

In this way, the screen before the abnormal termination illustrated in FIG. 7B appears at the restart after the abnormal termination.

Processing of Virtual Machine 104

Figure 9:
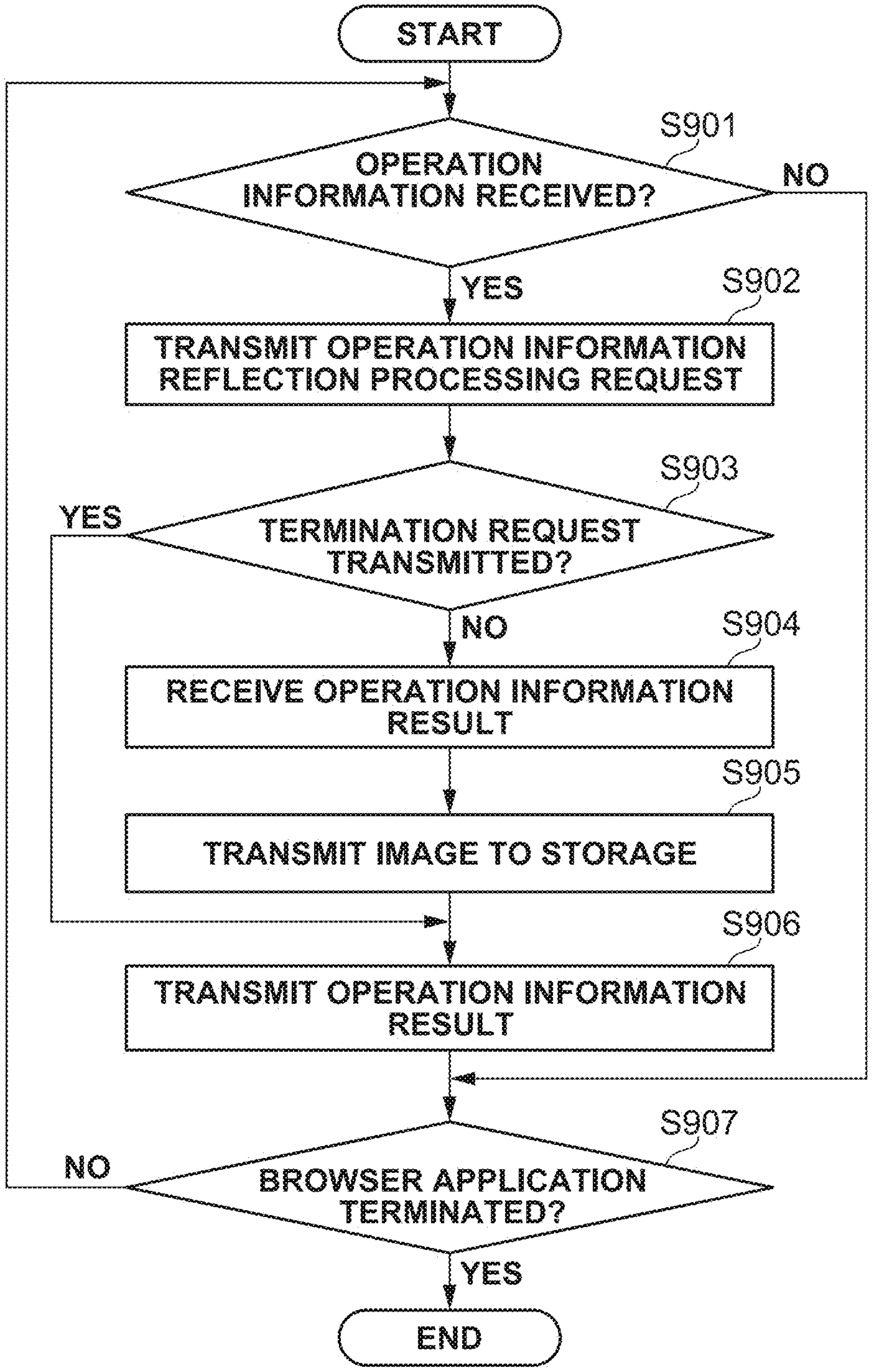
FIG. 9 is a flowchart illustrating a processing flow of the virtual machine according to the first embodiment of the present invention.

Next, the processing flow of the virtual machine 104 according to the first embodiment of the present invention will be described. FIG. 9 is a flowchart illustrating the processing flow of the virtual machine 104 according to the first embodiment of the present invention. The processing in the present flowchart is started in a state where the virtual machine 104 starts up the browser application.

(Step S901)

In step S901, the request determination unit 503 determines whether the communication unit 501 has received the operation information from the communication apparatus 101. As a result of the determination, if the communication unit 501 has received the operation information (YES in step S901), the processing proceeds to step S902. If the communication unit 501 has not received the operation information (NO in step S901), the processing proceeds to step S907. As described above, the operation information includes the termination request to terminate the browser application and the URL information of the web page. However, the URL information of the web page has been transmitted as the operation information, so here, it is assumed that the URL of the web page has been received.

(Step S902)

In step S902, the communication unit 501 transmits the operation information reflection processing request to the browser engine 105. A content of the transmission is determined from the operation information received in step S901, but it is assumed that the URL of the web page is received, so that a read request for the URL of the web page received in step S901 is transmitted. In a case where the operation information is the termination request to terminate the browser application, the browser application unit 504 performs termination processing on the browser application as the operation information reflection processing request, and the processing proceeds to step S903.

(Step S903)

In step S903, the browser application unit 504 determines whether the operation information reflection processing request transmitted in step S902 is the termination request to terminate the browser application. If the operation information reflection processing request is the termination request (YES in step S903), the processing proceeds to step S906. In step S906, the communication unit 501 transmits the information about the termination of the browser application to the communication apparatus 101 as the operation information result. At this time, the termination processing is performed on the browser application as described above, and thus the determination in step S907 is also YES, and the processing is terminated. In response to this, the determination result in step S807 is YES in the processing of the communication apparatus 101 as described above. Accordingly, termination processing is performed on the application running on the communication apparatus 101. On the other hand, if it is not the termination of the browser application (NO in step S903), the processing proceeds to step S904.

(Step S904)

In step S904, the communication unit 501 receives the operation information result from the browser engine 105. As described above, the operation information result is based on the transmission of the read request for the URL of the received web page, and therefore the web page read information is received. As will be described below, the web page read information is information about storing the image illustrated in FIG. 6, which is the image generated by imaging the rendering result of the web content, that is, the image acquired by rendering the web page, in the storage unit 502.

(Step S905)

In step S905, the communication unit 501 transmits the image illustrated in FIG. 6 acquired by rendering the web page stored in the storage unit 502 to the storage 106, and the image illustrated in FIG. 6 is stored in the storage 106.

(Step S906)

In step S906, the communication unit 501 transmits the operation information result to the communication apparatus 101. Specifically, the web page read information that is the operation information result received in step S904 is transmitted, but at this time, the image illustrated in FIG. 6 is stored in the storage 106. Thus, the operation information result that the communication unit 501 transmits to the communication apparatus 101 is information regarding the image (hereinbelow, also referred to as image information) for notifying that the image acquired by rendering the web page is stored in the storage 106.

(Step S907)

In step S907, the browser application unit 504 determines whether the browser application is terminated. In a case where the browser application is terminated (YES in step S907), the present processing is terminated. In a case where the browser application is not terminated (NO in step S907), the processing proceeds to step S901. In the processing in the present flowchart, the processing in step S901 and subsequent steps are repeated until it is determined as YES in step S907.

Processing of Browser Engine

Figure 10:
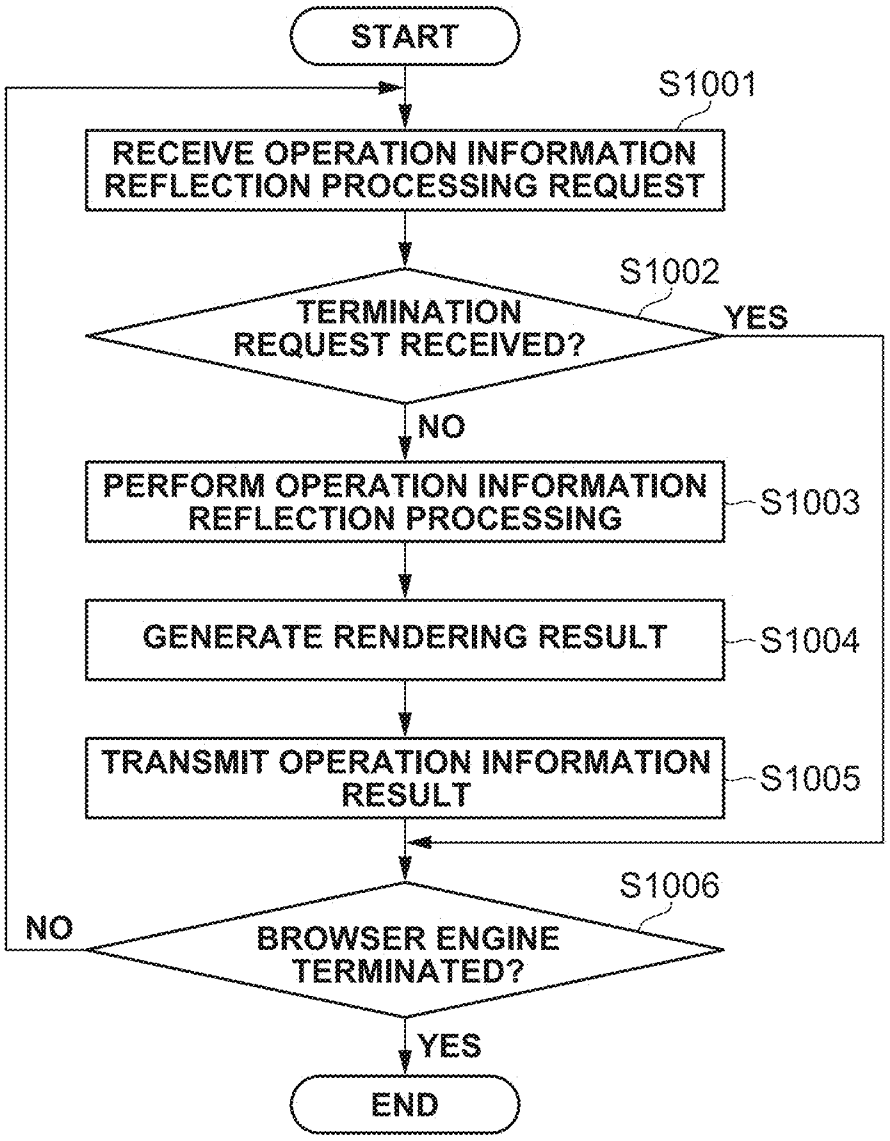
FIG. 10 is a flowchart illustrating a processing flow of the browser engine according to the first embodiment of the present invention.

Next, the processing flow of the browser engine 105 according to the first embodiment of the present invention will be described. FIG. 10 is a flowchart illustrating the processing flow of the browser engine 105 according to the first embodiment of the present invention. The processing in the present flowchart is started in a state where the virtual machine 104 starts up the browser engine 105.

(Step S1001)

In step S1001, the web content analysis unit 505 receives the operation information reflection processing request from the virtual machine 104. As described above, the operation information reflection processing request transmitted from the virtual machine 104 is the read request for the URL of the web page, so that the read request for the URL of the web page is received here.

(Step S1002)

In step S1002, it is determined whether the received operation information reflection processing request is the termination request instructing the termination of the browser application. The received operation information reflection processing request is not the termination request instructing the termination of the browser application, so that the determination is NO (NO in step S1002), and the processing proceeds to step S1003. In contrast, in a case where the received operation information reflection processing request is the termination request (YES in step S1002), the browser application unit 504 performs the termination processing on the browser application, and the processing proceeds to step S1006. In step S1006, the browser application unit 504 determines whether the browser engine is terminated. In this case, it is determined as YES in step S1006, and the present processing is terminated.

(Step S1003)

In step S1003, the web content analysis unit 505 performs the operation information reflection processing based on the operation information reflection processing request received in step S1001. In other words, the web content analysis unit 505 reads the web page with the corresponding URL (i.e., the web content) from the web server 102 via the communication unit 501 based on a web page read request for the URL of the received web page.

(Step S1004)

In step S1004, the web content rendering unit 506 generates a rendering result of the web content, and the image generation unit 507 generates an image by performing imaging the rendering result. Specifically, the image generation unit 507 generates the image illustrated in FIG. 6 from the rendering result, and the generated image is stored in the storage unit 502.

(Step S1005)

In step S1005, the web content analysis unit 505 transmits the operation information result to the virtual machine 104. In other words, the web content analysis unit 505 transmits information about reading the web page with the corresponding URL (i.e., the web content) from the web server 102 performed in step S1003. At this time, the storage unit 502 already stores the image illustrated in FIG. 6, which is the image generated by imaging the rendering result of the web content, that is, the image acquired by rendering the web page. Thus, the operation information result that the web content analysis unit 505 transmits to the virtual machine 104 is information about storing the image acquired by rendering the web page in the storage unit 502.

(Step S1006)

In step S1006, it is determined whether the browser engine 105 is terminated. As a result of the determination, in a case where the browser engine 105 is terminated (YES in step S1006), the present processing is terminated. In a case where the browser engine 105 is not terminated (NO in step S1006), the processing proceeds to step S1001.

In the processing in the present flowchart, the processing in step S1001 and subsequent steps are repeated until it is determined as YES in step S1006.

Performing the above-described processing has a following advantage because the application can be restarted from the screen that has been displayed at the time of the previous abnormal termination in a case where the application is abnormally terminated in the previous time.

Even in a case where the application of the communication apparatus 101 is abnormally terminated due to insufficient memory size or the like, the processing performed on the virtual machine 104 remains in a standby state.

However, the processing is restarted from reading the URL page after the application of the communication apparatus 101 is restarted and the browser application is accessed again using the URL.

In contrast, the application can be restarted from the screen that was displayed at the time of the previous abnormal termination in a case where the application is abnormally terminated in the previous time, according to the present embodiment as described above. Thus, the processing can be restarted from the state before the abnormal termination rather than from reading the URL page.

Thus, the processing can be restarted from continuation of input information or scroll information that has been performed before the previous abnormal termination.

The communication apparatus 101 and the virtual machine 104 according to a second embodiment of the present invention will now be described with reference to FIGS. 11 and 12. According to the second embodiment, the configuration of the information processing system 100 and the hardware and software configurations of the communication apparatus 101 are respectively the same as those in FIGS. 1 to 3. The hardware configuration of the virtual machine 104 and the software configuration of the virtual machine 104 and the browser engine 105 are respectively the same as those in FIGS. 4 and 5, and the processing flow of the browser engine 105 is the same as that in FIG. 10.

The second embodiment is an embodiment that takes into account a case where an application is abnormally terminated after the operation information is transmitted in step S805 in FIG. 8 and before the image illustrated in FIG. 6 is stored in the storage unit 302 in step S810 according to the first embodiment.

In this case, the image stored in the storage unit 302 is stored prior to the image illustrated in FIG. 6. Accordingly, a discrepancy occurs between a screen generated by displaying the image stored in the storage unit 302 on the graphical user interface 204 and a state of the virtual machine 104 in the standby state. However, this issue is also improved according to the second embodiment.

Processing of Communication Apparatus

Figure 11:
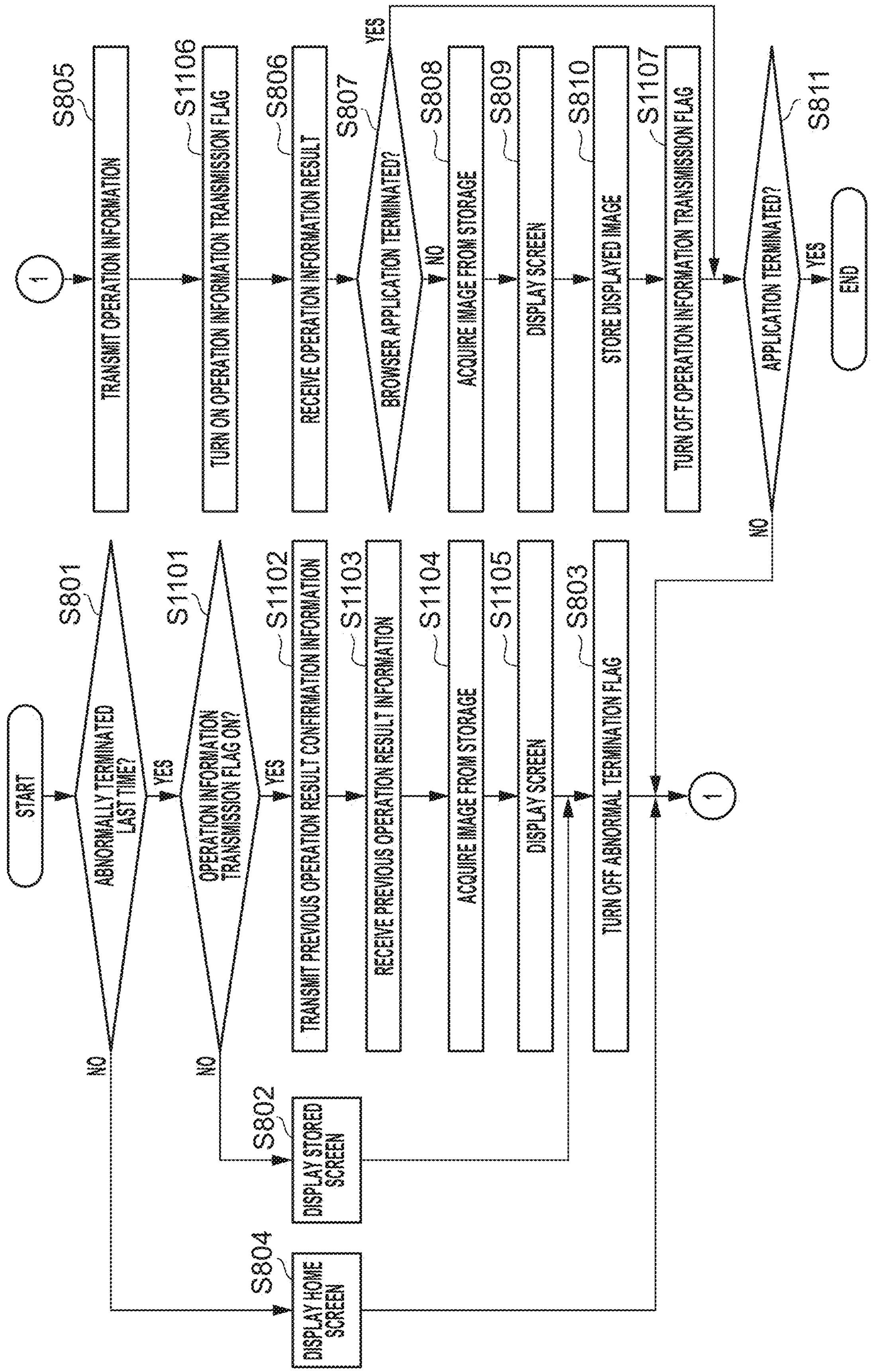
FIG. 11 is a flowchart illustrating a processing flow of a communication apparatus according to a second embodiment of the present invention.

FIG. 11 is a flowchart illustrating a processing flow of the communication apparatus 101 according to the second embodiment of the present invention. FIG. 11 is different from FIG. 8 in that items are added to a basic flow illustrated therein, so that the same items (steps S801 to S811) are denoted by the same step numbers, and the descriptions thereof may be omitted.

According to the present embodiment, the processing in the present flowchart is also started in a state where the communication apparatus 101 starts up an application in the application unit 306 and is connected to the virtual machine 104 and the storage 106 via the network, and the operation detection unit 303 receives the operation information.

According to the present embodiment, the abnormal termination flag is also turned ON in a case where the application unit 306 detects the abnormal termination of the application.

According to the present embodiment, in step S801, in a case where the status determination unit 307 determines whether the application has been abnormally terminated in the previous time based on the abnormal termination flag in the storage unit 302, and the abnormal termination flag is ON (YES in step S801), the processing proceeds to step S1101.

(Step S1101)

In step S1101, the status determination unit 307 determines the operation information transmission flag in the storage unit 302. Firstly, the operation information transmission flag will be described. The operation information transmission flag is turned ON in step S1106. Step S1106 proceeds after the transmission of the operation information (e.g., transmission of the URL information of the web page in the example described above) is performed in step S805 in FIG. 11. Further, the operation information transmission flag is turned OFF in step S1107. Step S1107 proceeds after the image, that is, the image illustrated in FIG. 6, which is used to generate the screen on the graphical user interface 204 in step S808, is stored in the storage unit 302 in step S810. Thus, in a case where a determination result in step S1101 is that the operation information transmission flag is OFF (NO in step S1101), this means that the abnormal termination of the application occurs after the image illustrated in FIG. 6 is appropriately stored in the storage unit 302. Thus, in a case where the operation information transmission flag is OFF (NO in step S1101), the processing proceeds to step S802. In step S802, the image illustrated in FIG. 6 stored in the storage unit 302 is displayed on the graphical user interface 204, and the screen illustrated in FIG. 7B before the abnormal termination is generated. In contrast, in a case where the determination result in step S1101 is that the operation information transmission flag is ON (YES in step S1101), this means that the abnormal termination of the application occurs before the image is stored in the storage unit 302 in step S810. Thus, the processing proceeds to step S1102, and corresponding processing is performed. In this way, the status determination unit 307 performs determination based on the operation information transmission flag and functions as a determination unit that determines, in step S810, whether the image is stored in the storage unit 302 after the communication unit 301 serving as a transmission unit transmits the operation information in step S805.

(Step S1102)

In step S1102, the communication unit 301 transmits previous operation result confirmation information to the virtual machine 104. The previous operation result confirmation information is a request to the virtual machine 104 to transmit the previous operation information result and is information determined in advance between the communication apparatus 101 and the virtual machine 104. In other words, the previous operation result confirmation information is a request for the operation information result (web page read information) corresponding to transmission of the previous operation information transmission (e.g., transmission of the URL information of the web page). In this way, in step S1101, in a case where the status determination unit 307 serving as the determination unit determines that the image is not stored in the storage unit 302 in step S810, the communication unit 301 functions as a confirmation information request transmission unit that transmits a confirmation information request as the previous operation result confirmation information.

(Step S1103)

In step S1103, the communication unit 301 receives previous operation result information (e.g., previous web page read information) from the virtual machine 104, and the response analysis unit 305 analyzes a content of the previous operation result information.

(Step S1104)

In step S1104, the communication unit 301 acquires an image from the storage 106. At this time, the image stored in the storage 106 is the image illustrated in FIG. 6 that would be stored in the storage unit 302 if the abnormal termination does not occur, and the image illustrated in FIG. 6 is acquired. Step S1104 is a newly added item and thus is denoted by a new step number, but a processing content to be performed is similar to that in step S808, so that a detailed description thereof will be omitted.

(Step S1105)

In step S1105, the screen generation unit 304 serving as the screen generation unit causes the graphical user interface 204 to display the image illustrated in FIG. 6 acquired in step S1104 and to generate the screen on the graphical user interface 204 illustrated in FIG. 7B. Step S1105 is a newly added item and thus is denoted by a new step number, but a processing content to be performed is similar to that in step S809, so that a detailed description thereof will be omitted.

(Step S1106)

In step S1106, the communication unit 301 turns ON the operation information transmission flag in the storage unit 302 as described above.

(Step S1107)

In step S1107, the communication unit 301 turns OFF the operation information transmission flag in the storage unit 302 as described above.

As in the first embodiment, the present processing repeats the processing in step S805 and subsequent steps until it is determined as YES in step S811.

Processing of Virtual Machine

Figure 12:
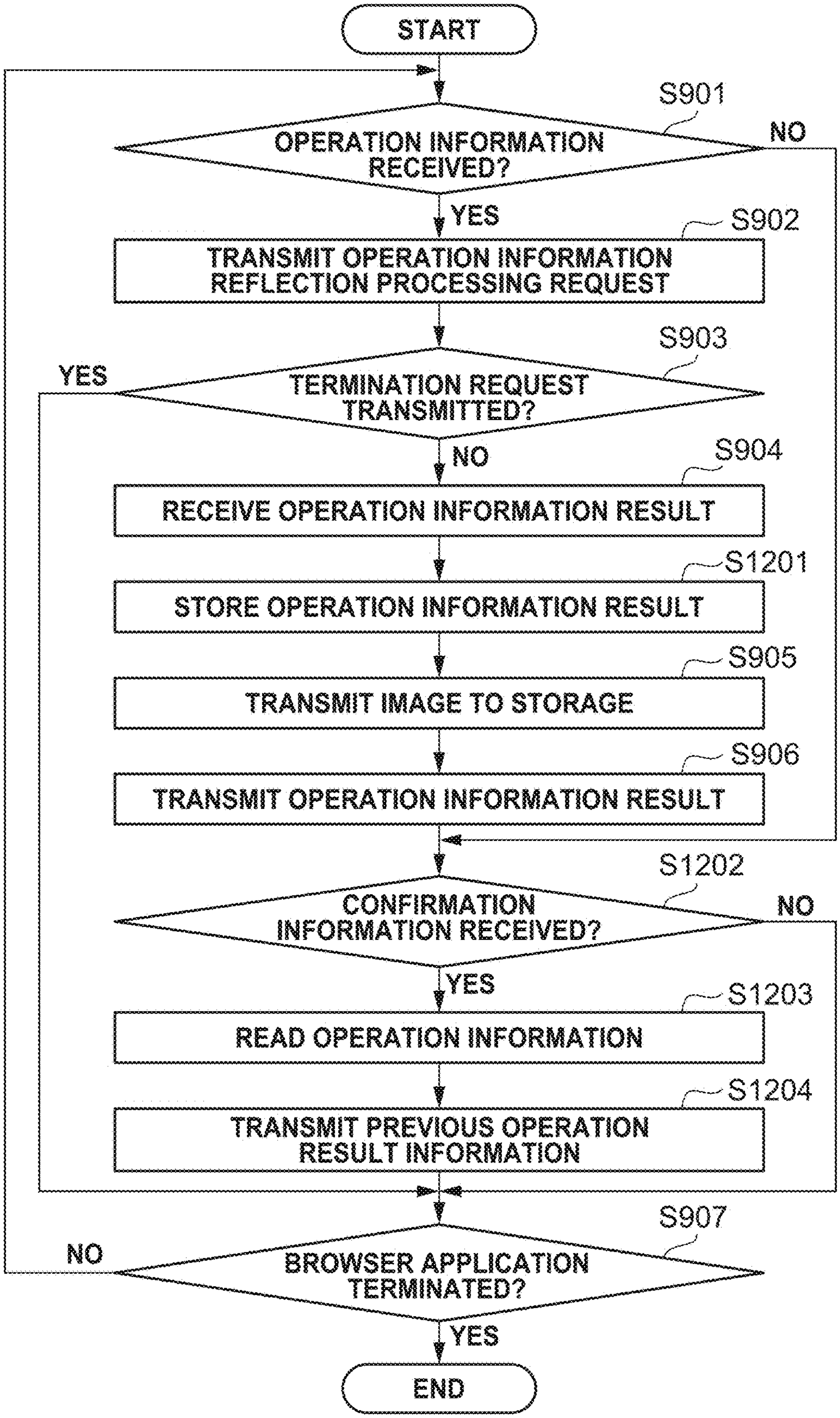
FIG. 12 is a flowchart illustrating a processing flow of a virtual machine according to the second embodiment of the present invention.

FIG. 12 is a flowchart illustrating a processing flow of the virtual machine 104 according to the second embodiment of the present invention. FIG. 12 is different from FIG. 9 in that items are added to the basic flow illustrated therein, so that the same items (steps S901 to S907) are denoted by the same step numbers, and the descriptions thereof may be omitted.

According to the present embodiment, the processing in the present flowchart is also started in a state where the virtual machine 104 starts up the browser application.

As described in the first embodiment, the request determination unit 503 determines, in step S901, whether the communication unit 501 has received the operation information from the communication apparatus 101. As in the first embodiment, in a case where the communication unit 501 receives the operation information from the communication apparatus 101, the determination in step S901 is YES, and then the processing proceeds to steps S902, S903, S904, and S1201.

In contrast, according to the second embodiment, the previous operation result confirmation information is received in some cases as described above with reference to the flowchart in FIG. 11. In this case, the previous operation result confirmation information is confirmation information, and thus the determination in step S901 is NO, and the processing proceeds to step S1202.

(Step S1201)

In step S1201, the browser application unit 504 stores the operation information result received in step S904 in the storage unit 502, and then the processing proceeds to steps S905, S906, and S1202. According to the example described in the first embodiment, the web page read information received in step S904 is stored in the storage unit 502. Specifically, the web page read information to be received is information about storing the image illustrated in FIG. 6, which is the image acquired by imaging the rendering result of the web content, in the storage unit 502.

(Step S1202)

In step S1202, the request determination unit 503 determines whether the communication unit 501 has received the previous operation result confirmation information. A case where the processing proceeds to step S1202 via step S1201 is a case where the determination result in step S901 is not the confirmation information but the operation information, so that the determination in step S1202 is NO, and the processing proceeds to step S907. In contrast, in the case of the above-described example, the confirmation information is received and the determination result in step S901 is NO, whereby the processing proceeds to step S1202. Thus, in this case, the determination result in step S1202 is YES, and the processing proceeds to step S1203.

(Step S1203)

In step S1203, the browser application unit 504 reads the operation information result stored in the storage unit 502. Following the above-described example, it is assumed that the web page read information is read from the storage unit 502.

(Step S1204)

In step S1204, the communication unit 501 transmits the previous operation result information (previous web page read information) to the communication apparatus 101. In response to this, the communication apparatus 101 receives the previous operation result information in step S1103 described above with reference to FIG. 11 and acquires an image, which is not stored in the storage unit 302 in step S1104, from the storage 106.

According to the second embodiment as described above, startup can be reliably performed in a screen state generated by the image illustrated in FIG. 6 even if the abnormal termination occurs after the operation information is transmitted in step S805 and before the image illustrated in FIG. 6 is stored in the storage unit 302 in step S810.

In other words, the screen illustrated in FIG. 7B is displayed at the time of resuming the application based on the image illustrated in FIG. 6, which has been displayed on the graphical user interface 204 before the previous abnormal termination, even if the image illustrated in FIG. 6 is not stored in the storage unit 302.

As can be seen from the above-described processing flow, the operation information transmitted before the previous abnormal termination is not transmitted again. Thus, processing for acquiring the web content again does not occur to acquire the image illustrated in FIG. 6 that is not stored in the storage unit 302, so that the virtual machine 104 can avoid performing the same operation for a plurality of times.

A third embodiment according to the present invention will now be described. In the third embodiment, it is also assumed that a screen specific to a communication apparatus (hereinbelow, also referred to as an apparatus specific screen) is further displayed on the graphical user interface 204. The apparatus specific screen is generated by the communication apparatus 101 itself (e.g., a software keyboard). The software keyboard is an example of a user interface according to the present invention, and such an apparatus specific screen may be referred to as a "UI".

Figure 13A:
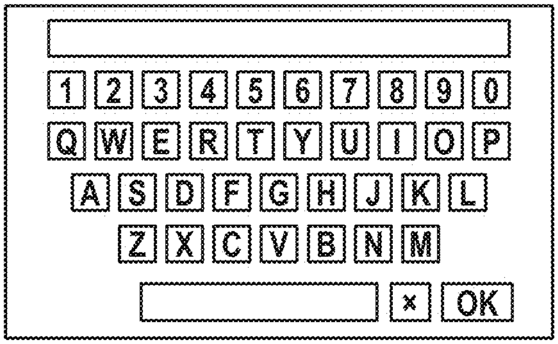
FIGS. 13A and 13B illustrate a state where a software keyboard as an apparatus specific screen according to a third embodiment of the present invention is displayed on a graphical user interface.
Figure 13B:
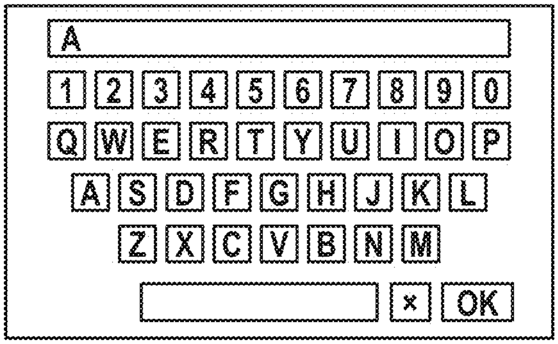

FIGS. 13A and 13B illustrate a state where a software keyboard serving as an apparatus specific screen according to the third embodiment of the present invention is displayed on the graphical user interface 204. FIG. 13A illustrates a screen on the graphical user interface 204 before an input is performed on the software keyboard. FIG. 13B illustrates a screen on the graphical user interface 204 after an alphabet "A" is input from the software keyboard.

The screen on the graphical user interface 204 illustrated in FIG. 13A appears, for example, when a user touches the text input field 700 while the screen illustrated in FIG. 7B is displayed on the graphical user interface 204.

According to the present embodiment, the screens of the software keyboard illustrated in FIGS. 13A and FIG. 13B are displayed superimposed on the image that configures the screen illustrated in FIG. 7B, so that the user can only see the software keyboard.

When the user touches the screen on the software keyboard and performs an operation, the operation detection unit 303 determines that an operation is performed on the apparatus specific screen.

In contrast, when the user performs an operation by touching, for example, a screen illustrated in FIG. 7B, which is not the apparatus specific screen, the operation detection unit 303 determines that the operation is not performed on the apparatus specific screen.

However, in a case where the user performs an operation of touching the text input field 700 on the screen illustrated in FIG. 7B, the screen generation unit 304 determines that it is necessary to generate a software keyboard as an apparatus specific screen.

Figure 14:
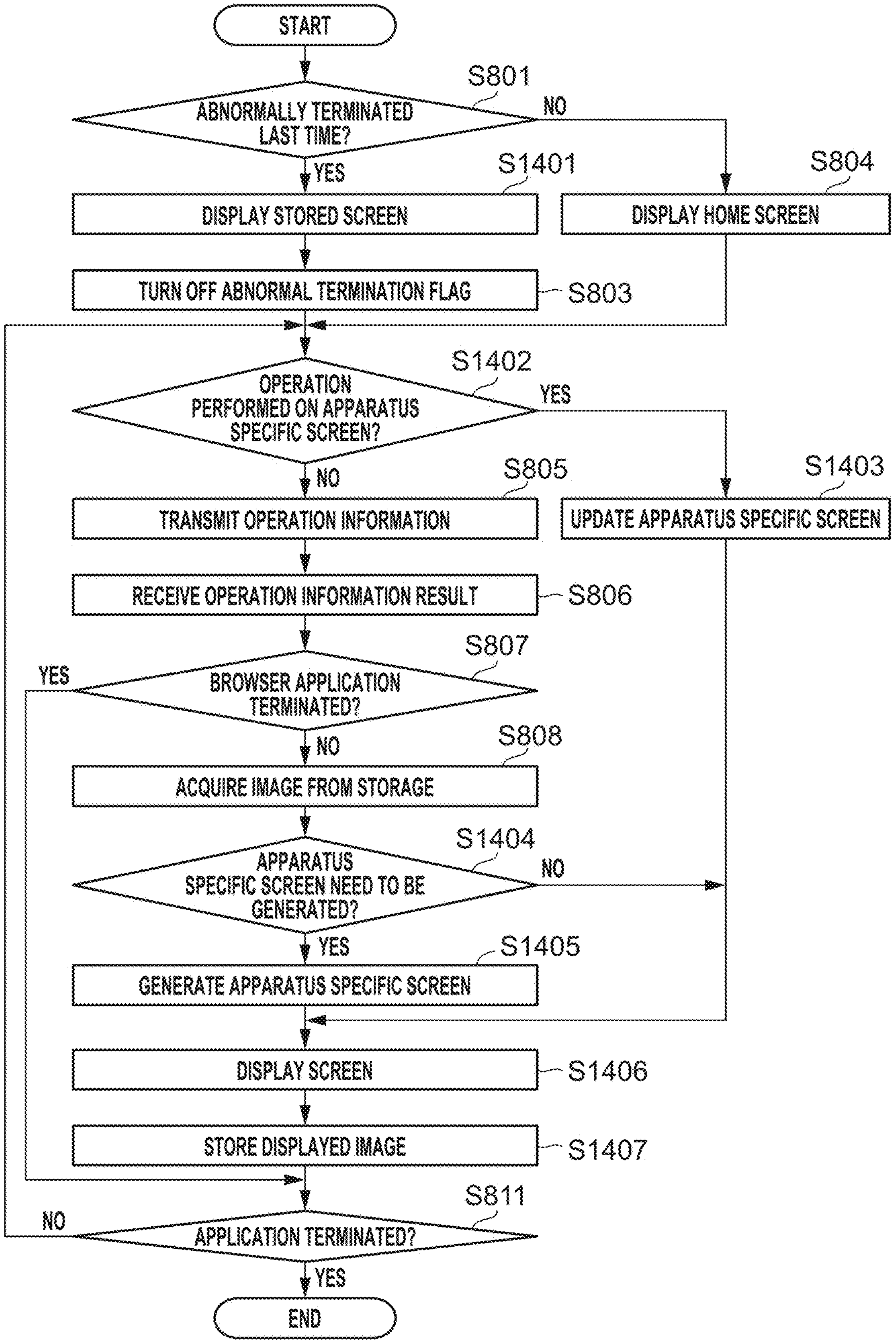
FIG. 14 is a flowchart illustrating a processing flow of a communication apparatus according to the third embodiment of the present invention.

Next, a processing flow of the communication apparatus 101 according to the third embodiment will be described with reference to FIG. 14. FIG. 14 is a flowchart illustrating the processing flow of the communication apparatus 101 according to the third embodiment of the present invention.

According to the third embodiment, the configuration of the information processing system 100 and the hardware and software configurations of the communication apparatus 101 are respectively the same as those in FIGS. 1 to 3.

Further, the hardware configuration of the virtual machine 104 and the software configurations of the virtual machine 104 and the browser engine 105 are respectively the same as those in FIGS. 4 and 5.

Furthermore, a processing flow of the virtual machine 104 is the same as that in FIG. 9, and a processing flow of the browser engine 105 is the same as that in FIG. 10.

The processing in steps S801, S803 to S808, and S811 in FIG. 14 are respectively the same as those in steps S801, S803 to S808, and S811 in FIG. 8, so that the descriptions thereof may be omitted.

In the following descriptions, it is assumed that, in a case where the processing in the present flowchart is started, the communication apparatus 101 has already started up an application in the application unit 306 and is connected to the virtual machine 104 and the storage 106 via the network as in the above-described cases.

However, to make it easier to understand the following description, it is assumed that the startup of the application is a restart after the abnormal termination, and the abnormal termination flag is ON.

It is also assumed that the restart is performed in a state where the image illustrated in FIG. 6 is stored in the storage unit 302.

In step S801, determination is performed based on the abnormal termination flag as in the above-described cases. However, the abnormal termination flag is ON in this case as described above, and thus the processing proceeds to step S1401.

(Step S1401)

In step S1401, as described in step S802, the screen generation unit 304 displays the image illustrated in FIG. 6 stored in the storage unit 302 on the graphical user interface 204, so that the screen illustrated in FIG. 7B is generated. In contrast, the storage unit 302 may store apparatus specific screen information, such as the software keyboard, in addition to the image (the image based on the web content as illustrated in FIG. 6) according to the present embodiment, as will be described below. In this case, the screen generation unit 304 generates the screen on the graphical user interface 204 based on the image stored in the storage unit 302 and the apparatus specific screen information. For example, the apparatus specific screen information stored in the storage unit 302 is an identification (ID) of a screen to be used to generate the software keyboard illustrated in FIG. 13A. In this case, the screen generation unit 304 displays an image that is acquired by adding the software keyboard as a predetermined UI to the image stored in the storage unit 302 on the graphical user interface 204 to generate the screen on the graphical user interface 204.

(Step S1402)

In step S1402, the operation detection unit 303 determines whether an operation is performed on the apparatus specific screen. As described above, the current screen on the graphical user interface 204 is the screen illustrated in FIG. 7B. Thus, it is assumed here that a user performs an operation of touching the text input field 700, and operation information thereof is determined. In this case, as described above, the operation is not performed on the software keyboard, the operation detection unit 303 determines that the operation is not performed on the apparatus specific screen (NO in step S1402), and the processing sequentially proceeds to steps S805, S806, S807, S808, and S1404. Thus, in a case where an operation of touching the text input field 700 is performed, the operation information indicating that the operation of touching the text input field 700 is performed is transmitted to the virtual machine 104 in step S805. In step S806, a result that the text input field 700 is touched is received as the operation information result, which is a result of the operation information. In response to the operation of touching the text input field 700, an image corresponding to the operation of touching the text input field 700 may be generated by the processing of the virtual machine 104 and the browser engine 105 and stored in the storage 106. Since the browser application is not terminated, the determination in step S807 is NO, the processing proceeds to step S808. In step S808, the stored image is acquired from the storage 106, and the processing proceeds to step S1404.

(Step S1404)

In step S1404, the screen generation unit 304 determines whether the apparatus specific screen is to be generated. In step S806, the result that the text input field 700 is touched is received as the operation information result, and as described above, the screen generation unit 304 determines that the apparatus specific screen is to be generated in a case where the operation of touching the text input field 700 is performed. Thus, the screen generation unit 304 determines as YES in step S1404 based on the operation information result received in step S806, and the processing proceeds to step S1405.

(Step S1405)

In step S1405, the screen generation unit 304 generates the apparatus specific screen. As described above, in a case where the result is that the text input field 700 is touched, the screen generation unit 304 generates the software keyboard as the apparatus specific screen. Specifically, the screen generation unit 304 generates the software keyboard based on the ID of the screen to be used to generate the software keyboard illustrated in FIG. 13A that is stored in the storage unit 302.

(Step S1406)

In step S1406, the screen generation unit 304 performs screen display to display the image acquired by adding the software keyboard (UI) generated in step S1405 to the image received in step S808 on the graphical user interface 204. The display on the graphical user interface 204 is not limited to the image acquired by adding the software keyboard (UI) to the image received in step S808 and may be either one of the software keyboard or the image received in step S808. According to the present embodiment, as described above, the software keyboard (UI) is located at the top, and thus the screen on the graphical user interface 204 is the screen illustrated in FIG. 13A.

(Step S1407)

In step S1407, the storage unit 302 stores the image used to generate the screen in step S1406 and the apparatus specific screen information (e.g., the ID of the screen required to generate the software keyboard). If the determination result in step S811 is NO, the processing proceeds to step S1402 again. As described below, in a case where the determination result in step S1402 is YES and the processing proceeds to step S1407 via step S1403, the operation is performed on the apparatus specific screen information (e.g., software keyboard). In this case, the storage unit 302 may store the operation information that is the content of the operation.

A case where the processing proceeds to step S1403 will be specifically described. It is assumed that a user performs a touch operation for inputting characters by touching the software keyboard currently displayed on the graphical user interface 204. For example, if the user performs a touch operation of inputting a letter "A" as illustrated in FIG. 13B, the operation detection unit 303 determines YES in step S1402, and the processing proceeds to step S1403. As described above, the operation detection unit 303 functions as a UI operation determination unit that determines whether it is the operation performed on the software keyboard as the UI.

(Step S1403)

In step S1403, the screen generation unit 304 updates the apparatus specific screen. Thereafter, the screen generation unit 304 displays the generated screen on the graphical user interface 204. In this case, the screen on the graphical user interface 204 is similar to the screen illustrated in FIG. 13. The processing then proceeds to steps S1406 and S1407 again. In this case, there is operation information indicating that the touch operation of inputting the letter "A" has been performed on the software keyboard. Thus, the storage unit 302 also stores the operation information of the touch operation of inputting the letter "A" in addition to the image used to generate the screen in step S1406 and the apparatus specific screen information (e.g., the ID of the screen used to generate the software keyboard). In this way, the storage unit 302 also functions as a UI operation storage unit for storing an operation performed on the software keyboard as the UI.

In a case where the application is abnormally terminated and restarted, the processing in step S1401 may be performed as follows.

In the processing in step S1401 at the time of restart, the screen generation unit 304 automatically executes processing based on the operation information of the touch operation of inputting "A" stored in the storage unit 302 so that the screen in the state after the operation appears.

In a case where the screen generation unit 304 performs display after the abnormal termination in this way, the screen generation unit 304 also functions as a UI operation execution unit that executes the operation on the software keyboard serving as a UI stored in the UI operation storage unit.

As described above, according to the third embodiment, it is possible to resume processing from the screen display before the abnormal termination when the application is abnormally terminated, in a case where the communication apparatus 101 generates the apparatus specific screen, combines the apparatus specific screen with the image of the rendering result of the web content, and displays the result on the communication apparatus 101.

The present invention is described above based on the specific embodiments. However, the present invention is not limited to the above-described embodiments.

Any modification and improvement of the above-described embodiments are also included within the technical scope of the present invention, and it will be apparent to those skilled in the art from the descriptions of the claims.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2023-219907, filed Dec. 26, 2023, and No. 2024-130202, filed Aug. 6, 2024, which are hereby incorporated by reference herein in their entirety.

What is claimed is:

1. A communication terminal comprising:

a receiver configured to receive image information acquired by rendering a web page;

a display configured to display an image generated based on the image information received via and from rendering the web page;

a storage configured to store one or more images to be displayed; and one or more processors that operate to:

store the generated image in the storage before display of the generated image is abnormally terminated;

determine whether the display of the generated image is abnormally terminated;

acquire the generated image from the storage and display the generated image after the display of the generated image is abnormally terminated to restore the display of the generated image;

receive a result of operation information of the web page and determine whether the result is termination of the web page after the display of the generated image is abnormally terminated;

in a case where the web page is not terminated and after the display of the generated image is abnormally terminated, acquire an image from the storage based on the received image information acquired from rendering the web page, generate a screen including the acquired image, display the generated screen including the acquired image, and store the displayed image in the storage;

in a case where a normal startup occurs or where the display of the generated image is not abnormally terminated, display another image;

determine whether an operation is performed on an apparatus specific screen;

in a case where the operation is performed on the apparatus specific screen, update the apparatus specific screen to show a change to the apparatus specific screen caused by the operation, display the updated apparatus specific screen including the acquired image, and store the displayed image in the storage; and in a case where the operation is not performed on the apparatus specific screen, transmit the operation information to a virtual machine, receive the result of the operation information from the virtual machine, determine whether the result is the termination of the web page or not, and in the case where the web page is not terminated and after the display of the generated image is abnormally terminated, acquire the image from the storage, and in a case where an apparatus specific screen needs to be generated, generate the apparatus specific screen, display the generated apparatus specific screen including the acquired image, and store the displayed image in the storage.

2. The communication terminal according to claim 1, wherein the display displays the generated image acquired by adding, and displaying the generated image on or with, a predetermined user interface (UI), and/or the generated screen includes the acquired image such that the generated screen displays the acquired image on the predetermined UI.

3. The communication terminal according to claim 2, further comprising:

a UI operation storage configured to store an operation to be performed on the predetermined UI, wherein the one or more processors further operate to:

determine whether the operation is performed on the predetermined UI; and in a case where display is performed after the display of the image is abnormally terminated, execute the operation stored in the UI operation storage.

4. The communication terminal according to claim 1, further comprising:

a transmitter configured to transmit the operation information of the web page, wherein the one or more processors further operate to determine, after transmission by the transmitter, whether the image based on the image information received by the receiver is stored in the storage, and, in a case where the image is stored in the storage, acquire the image from the storage based on the received image information acquired from rendering the web page to generate the screen; and a confirmation information request transmitter configured to, in a case where display of the image is abnormally terminated and the one or more processors determine that the image is not stored in the storage, transmit a confirmation information request.

5. The communication terminal according to claim 1, wherein the one or more processors further operate to perform one or more of the following:

(i) determine whether the normal startup occurs in a case where the display is not abnormally terminated; and/or (ii) set an abnormal termination flag to off, and, in a case where the display of the generated image is abnormally terminated, change the abnormal termination flag to on and then, after the generated image is displayed, change the abnormal termination flag to off.

6. The communication terminal according to claim 5, wherein the another image is a home screen image.

7. The communication terminal according to claim 1, wherein the one or more processors further operate to perform one or more of the following:

(i) in a case where the display of the generated image is abnormally terminated, transmit the operation information to a virtual machine, and receive the result of the operation information from the virtual machine; and/or (ii) in a case where the display of the generated image is abnormally terminated and in a case where the result of the operation information is that the web page is terminated, determine whether an application involving the web page is terminated, and, in a case where the application is not terminated, transmit the operation information to a virtual machine, and receive the result of the operation information from the virtual machine.

8. The communication terminal according to claim 1, wherein the one or more processors further operate to:

(i) after the display of the generated image is abnormally terminated, determine whether an operation information transmission flag is on;

(ii) in a case where the operation information transmission flag is off, display the stored, generated image or display a stored screen including the generated image;

(iii) in a case where the operation information transmission flag is on, transmit and/or receive previous operation result confirmation information from a virtual machine to the one or more processors, and analyze a content of a previous operation result information; and (iv) acquire an image from the storage, and display the acquired image or a screen including the acquired image.

9. The communication terminal according to claim 8, wherein the one or more processors further operate to:

(i) after the stored, generated image or the stored screen including the generated image is displayed or after the image acquired image or the screen including the acquired image is displayed, set an abnormal termination flag to off;

(ii) transmit the operation information to a virtual machine, turn on the operation information transmission flag, and receive the result of the operation information from the virtual machine; and (iii) in the case where the web page is not terminated, after the display of the generated image is abnormally terminated, and after the storage of the displayed, acquired image, turn off the operation information transmission flag.

10. A method for controlling a communication terminal, the method comprising:

receiving image information acquired by rendering a web page;

displaying an image generated based on the image information received via and from rendering the web page;

storing the generated image in a storage before display of the generated image is abnormally terminated;

determining whether the display of the generated image is abnormally terminated;

acquiring the generated image from the storage and displaying the generated image after the display of the generated image is abnormally terminated to restore the display of the generated image;

receiving a result of operation information of the web page and determining whether the result is termination of the web page after the display of the generated image is abnormally terminated;

in a case where the web page is not terminated and after the display of the generated image is abnormally terminated, acquiring an image from the storage based on the received image information acquired from rendering the web page, generating a screen including the acquired image, displaying the generated screen including the acquired image, and storing the displayed image in the storage;

in a case where a normal startup occurs or where the display of the generated image is not abnormally terminated, displaying another image;

determining whether an operation is performed on an apparatus specific screen;

in a case where the operation is performed on the apparatus specific screen, updating the apparatus specific screen to show a change to the apparatus specific screen caused by the operation, displaying the updated apparatus specific screen including the acquired image, and storing the displayed image in the storage; and in a case where the operation is not performed on the apparatus specific screen, transmitting the operation information to a virtual machine, receiving the result of the operation information from the virtual machine, determining whether the result is the termination of the web page or not, and in the case where the web page is not terminated and after the display of the generated image is abnormally terminated, acquiring the image from the storage, and in a case where an apparatus specific screen needs to be generated, generating the apparatus specific screen, displaying the generated apparatus specific screen including the acquired image, and storing the displayed image in the storage.

11. A non-transitory storage medium storing a program that when executed by a communication terminal causes the communication terminal to perform the method according to claim 10.

* * * * *